United States Patent
Aaltonen et al.

(10) Patent No.: US 8,391,901 B2
(45) Date of Patent: Mar. 5, 2013

(54) SYSTEM AND METHOD OF CONTROLLING DELIVERY OF MULTIMEDIA MESSAGES

(75) Inventors: Janne Aaltonen, Turku (FI); Timo Ahopelto, Helsinki (FI)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/009,180

(22) Filed: Jan. 19, 2011
(Under 37 CFR 1.47)

(65) Prior Publication Data
US 2012/0021781 A1 Jan. 26, 2012

Related U.S. Application Data

(63) Continuation of application No. PCT/EP2009/066173, filed on Dec. 1, 2009.

(30) Foreign Application Priority Data

Dec. 1, 2008 (GB) .................................. 0821878.6

(51) Int. Cl.
*H04W 4/00* (2009.01)
(52) U.S. Cl. .................. 455/466; 455/412.1; 455/412.2; 455/414.1; 714/749; 709/206; 705/14.64; 705/14.49
(58) Field of Classification Search ............... 455/412.1, 455/412.2, 466, 414.1; 705/14.64, 14.49; 714/748, 749; 709/206
See application file for complete search history.

(56) References Cited

U.S. PATENT DOCUMENTS

| 6,631,400 | B1 | 10/2003 | DiSefano, III |
| 2005/0097473 | A1 | 5/2005 | Malik et al. |
| 2005/0165897 | A1 * | 7/2005 | Prenzel et al. ................. 709/207 |
| 2007/0260692 | A1 | 11/2007 | Burgoyne et al. |
| 2008/0161028 | A1 | 7/2008 | Fonde et al. |
| 2008/0207181 | A1 * | 8/2008 | Jiang .......................... 455/414.1 |
| 2008/0287150 | A1 * | 11/2008 | Jiang et al. .................... 455/466 |

FOREIGN PATENT DOCUMENTS

| EP | 1770932 A1 | 4/2007 |
| FR | 2868899 A1 | 10/2005 |
| GB | 2445630 A | 7/2008 |
| WO | WO 03/056445 A1 | 7/2003 |
| WO | WO 2005/048617 A1 | 5/2005 |
| WO | WO 2005/076572 A1 | 8/2005 |

OTHER PUBLICATIONS

Examination Report under Section 18(3) issued Feb. 17, 2011 by the U.K. Patent Office in related U.K. Application GB 0821878.6 (4 pages).
Search Report under Section 17 Dated Feb. 23, 2009 issued by the U.K. Intellectual Property Office in a related Great Britain Application No. 0821878.6 (pp. 2).
International Search Report mailed Feb. 25, 2010 issued by the International Searching Authority in a related International Application No. PCT/EP2009/066173 (pp. 2).

* cited by examiner

*Primary Examiner* — Kamran Afshar
*Assistant Examiner* — Khalid Shaheed
(74) *Attorney, Agent, or Firm* — Novak Druce Connolly Bove + Quigg LLP

(57) ABSTRACT

A system and method concerned with supporting or implementing functionality to provide efficient delivery of MMS messages to a plurality of recipients. In at least one arrangement the delivery status of already transmitted MMS messages is monitored; for a plurality of messages having a delivery status indicating that the messages are undeliverable to the intended recipient, a new set of recipients is selected and MMS messages transmitted to the new set of recipients. In this way delivery of a desired quota of deliverable MMS messages is effected with greater efficiency than is possible with conventional methods.

28 Claims, 5 Drawing Sheets

Figure 2: Conventional Message Flow

_US 8,391,901 B2_

SYSTEM AND METHOD OF CONTROLLING DELIVERY OF MULTIMEDIA MESSAGES

CROSS REFERENCE TO RELATED APPLICATIONS

This is a continuation Application of International Application No. PCT/EP2009/066173, filed on Dec. 1, 2009, which claimed the priority of Great Britain Application No. 0821878.6, filed Dec. 1, 2008, the entire content of each of which is incorporated herein by reference.

FIELD OF THE INVENTION

The present invention relates to a system and method of controlling the delivery of multimedia service (MMS) messages to a plurality of recipients and is particularly, but not exclusively suited to controlling the delivery of MMS messages having specified content to a plurality of recipients.

BACKGROUND OF THE INVENTION

Many information services are configured to send content to subscribers of the service via the Short Messaging Service (SMS), by e-mail and/or via the Multimedia Messaging Service (MMS). A particular problem is experienced in the transmission of MMS messages owing to the reliance on recipient terminals having a particular configuration and set of capabilities. For information services that are arranged to deliver messages to a large number of recipients, failed message delivery attempts can result in a wasteful use of network resources; this problem can become acute when attempting delivery to a large number of targeted recipients, and in view of the fact that conventional methods solve the failed delivery problem by (configurable) retransmission of the messages.

With such conventional methods the undelivered message is typically simply reintroduced into the message queue of the MMSC. This triggers delivery of the recycled message per any other message, either as soon as the queue is free or on the basis of a predetermined or dynamic time interval depending on the loading on the MMSC. A typical re-transmission setting is to try sending a given message a maximum of 5 times, within the constraints of time to live criteria specifying a period of e.g. 2 hours or 4 hours for the attempted re-transmissions. Assuming a scenario in which 5000 messages have been successfully delivered in the first attempt, 1000 have been successfully delivered in the second attempt, 1000 in the third attempt and 3000 did not receive the message, (even after trying 5 times as set as limit for example) it will be appreciated that successful delivery of 7000 messages involved 10000+5000+4000+3000+3000=25000 message delivery attempts and an associated success rate of 7/25. A typical example of such a conventional method is provided in international patent publication number WO2005/076572.

It will be appreciated that the aforementioned problem scales with the number of delivery attempts, since for the set of 3000 persons that are not in radio coverage or the terminals are off or the terminal settings are wrong, there is no number of delivery attempts that will result in successful delivery of the MMS message to these recipients.

As described in international publication number WO2003/056445 and French patent application number FR2868899, data communication network. design engineers can control the delivery of messages in a communication network by identifying a new recipient in the event that a single message fails to be delivered and re-transmitting the message content to the newly identified recipient.

A problem with the above proposed solution is that the system resources are expected to be continually dedicated to the task of re-transmitting message content as in each instance that a message fails to be delivered, a new recipient is selected and the message content is re-transmitted to the newly identified recipient. This ineffective use of system resources is also expected to result in a large back-log of message throughput, in particular when a large number of messages require re-transmission.

SUMMARY OF THE INVENTION

In accordance with at least one embodiment of the invention, methods, systems and software are provided for supporting or implementing functionality to provide efficient delivery of MMS messages to a plurality of recipients without undue use of available system resources, as specified in the independent claims. This is achieved by a combination of features recited in each independent claim. Accordingly, dependent claims prescribe further detailed implementations of the present invention.

More particularly, aspects of the invention provide a method of controlling delivery of a plurality of Multimedia Messaging Services (MMS) messages in a communications network, each said MMS message having a message body comprising content, and transmission information identifying a terminal associated with a receiving party, the receiving party being different for each said MMS message, the method comprising:

monitoring delivery status information associated with at least some said MMS messages that have been transmitted through the communications network on the basis of their respective transmission information so as to identify MMS messages having a delivery status of a first type; and responsive to a plurality of said MMS messages identified to have the delivery status of the first type, creating a trigger for selecting further recipients for MMS messages comprising said content, the number of further recipients selected being dependent on the number of MMS messages identified as having a delivery status of the first type.

In this manner the claimed invention addresses the problem of effective system resource usage in a message re-transmission system, such as is described in international patent publication numbers WO2005/076572 and WO2003/056445. In this regard, the claimed invention provides for the identification of new recipients and the re-transmission of message content to newly identified recipients in a batch-by-batch manner, as opposed to a message-by-message manner. In this manner the system resource requirements in terms of the selection of new recipients and the re-transmission of message content is greatly reduced. It will be further appreciated that the above batch-by-batch configuration lends itself to an increased message throughput.

In this regard, it will be appreciated that the creation of the abovementioned trigger, for the selection of further recipients, may be dependent on the identification of a predetermined number of MMS messages having a delivery status of the first type.

Embodiments of the invention provide a mechanism for improved efficiency of message delivery, as can be seen from the following example, in which it is assumed that messages containing content were originally transmitted to 10000 out of a potential 40000 recipients. In the event that 5000 negative acknowledgments are received, instead of attempting 5000 re-transmissions to the same recipients, 5000 of the previously unselected (remaining) recipients are selected and the content transmitted to these newly selected recipients.

Assuming a 50% success in delivery rate for this next selected set of recipients, it can be expected that 2500 of the message transmissions will be successful. The total number of delivery attempts is then 10000+5000=15000, with an associated delivery success rate of ½. This is a significant improvement over the prior art delivery methods, which, as set out in the background section, have an associated message transmission efficiency of 7/25.

In an alternative embodiment, instead of selecting as many new recipients, during the second delivery attempt, as there were failed delivery attempts (in the example 5000), a number of new recipients greater than the number of failed delivery attempts is selected. For example, in one embodiment 10000 new recipients are selected; and assuming the same success rate for message delivery of this second set of 10000 recipients, the message transmission efficiency will again be ½ (per the first embodiment). Therefore, in this (second) embodiment, the first two sets of message delivery attempts will involve 20000 message transmissions (instead of 15000 message transmissions, as involved in the first two sets of message delivery attempts per the first embodiment). In this regard it will be appreciated that, in the second embodiment, 20000 message transmissions could be achieved through only two sets of message delivery attempts (10000+10000) (whereas the first embodiment would require 3 sets of message delivery attempts to achieve the same number of message transmissions (10000+5000+5000)).

Therefore, generally, embodiments can be configured such that the selection of the number of recipients can be coupled to the delivery success rate from a previous transmission event. For example, assuming the delivery success rate for the delivery of the first set of messages (10000) to be 50%, this would be used to select a number of recipients (5000) for the next subsequent transmission event. In the event that the delivery success rate for the initial transmission event were 7500 (75%), the number of recipients selected for the next transmission event that would result in all 10000 messages being successfully delivered after the second delivery event would be 2500/0.75=3333.33 recipients.

In some embodiments, further delivery attempts in respect of MMS messages identified to have the delivery status of the first type are cancelled, or aborted, thereby freeing up delivery capacity of the MMS relay server responsible for MMS message delivery.

Further features and advantages of the invention will become apparent from the following description of preferred embodiments of the invention, given by way of example only, which is made with reference to the accompanying drawings.

DETAILED DESCRIPTION OF THE INVENTION

As described above, embodiments of the invention are concerned with improving the efficiency of the delivery of Multimedia Service (MMS) messages, in particular the effective usage of system resources to coordinate and ensure the delivery of messages to a plurality of recipients. Typically embodiments of the invention would be applicable to subscribers of a mobile communications network 10 shown in FIG. 1; an exemplifying arrangement of the associated network components will now be described, by way of an introduction to embodiments of the invention.

The mobile network 10 can be any cellular, broadcast, wide area network. Examples of cellular network technologies include but are not limited to GSM (Global System for Mobile communication), WCDMA (Wideband CDMA), CDMA (Code Division Multiple Access), GPRS (General Packet Radio Service), UTRAN (UMTS Radio Access Network), UMTS (Universal Mobile Telecommunications System), MBMS (Multicast Broadcast Multimedia System). Examples of other network technologies include but are not limited to local area networks, such as Wireless Local area networks (WLAN), BlueTooth (BT), and other technologies, such as WiMax (Worldwide Interoperability for Microwave Access). Broadcasting over cellular, Broadcasting over DVB-H (Digital Video Broadcasting-Handhelds), ISDB-T (Terrestrial Integrated Services Digital Broadcasting), DMB (Digital Multimedia Broadcasting). The communication network 10 may also be connected to a public switched telephone network (not shown) and can provide generic Internet access using any transport methods. The communications network can thus be considered a combination of different communication network technologies 9, 10.

Figure 1:
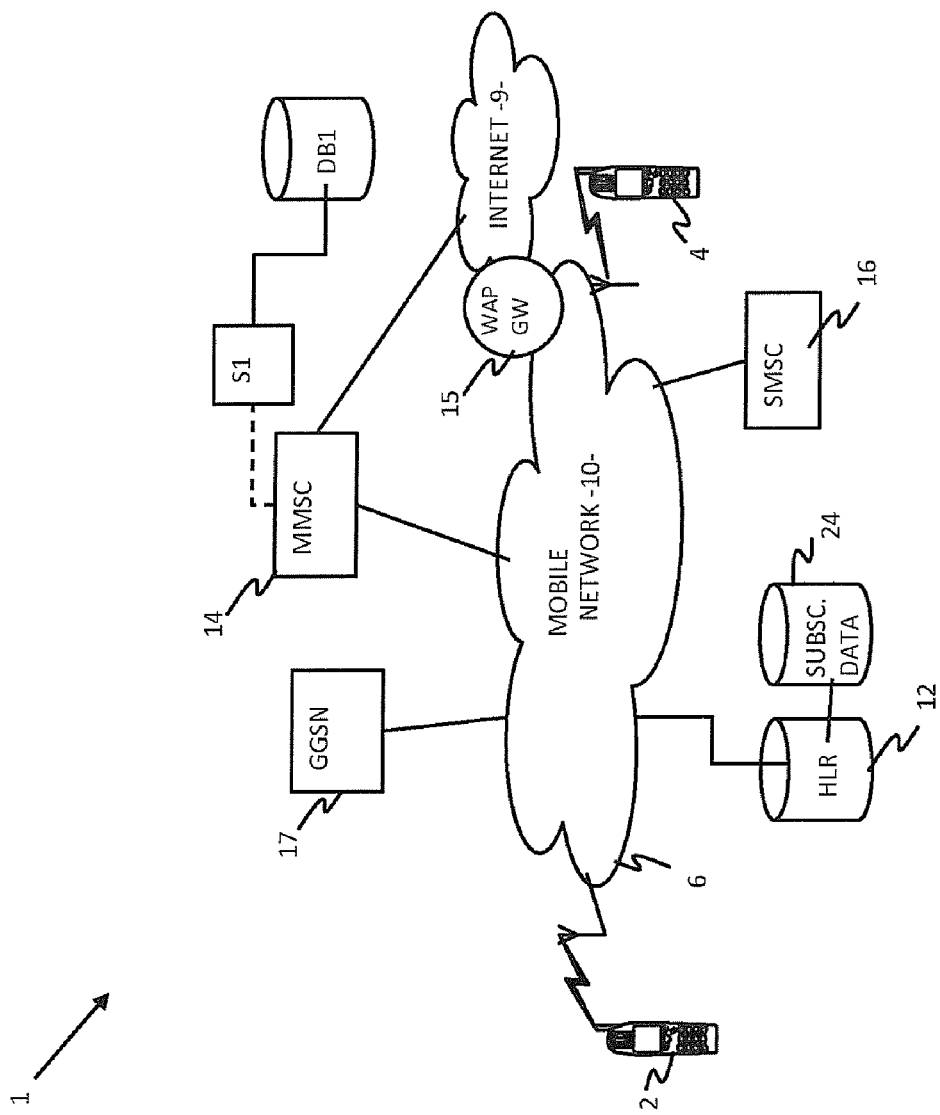
FIG. 1 is a schematic diagram showing an environment in which a first embodiment of the invention can operate.

The exemplary GSM, GPRS communications network 10 of FIG. 1 comprises a radio access domain (not shown) for coordinating transmission of data over the radio layer via standard radio interfaces. In addition the network 10 comprises a core network portion, comprising standard components such as a home location register (HLR) 12, which is a database permanently storing subscriber authentication data, and switching components (not shown, but commonly referred to as MSC, and a visitor location register (VLR) which is a database temporarily storing subscriber authentication data for mobile stations active in its area). Subscribers may originate or receive multimedia, video, voice, data or fax calls or sessions, short messages using the Short Message Service (SMS) via SMSC 16, and email messages, enhanced or multimedia messages (MMS) via MMSC 14. Furthermore the user may access data and multimedia resources over private or public data networks such as the Internet 9. Signalling and data in respect of services provided to mobile stations 2, 4 is routed via the core network switching components (MSCs).

The mobile terminals 2, 4 may be a mobile phone, a personal digital assistant (PDA), a multimedia computer, a personal computer, a lap top, etc., or generally any terminal capable of accessing services, such as content download, web browsing, streaming, Wireless Application Protocol (WAP) browsing, voice and messaging. In the case of the mobile network 10 being embodied as a GSM, GPRS or WCDMA network, the terminal is a mobile phone with associated GSM, GPRS or WCDMA functionalities. While FIG. 1 shows two terminals 2, 4, embodiments of the invention are particularly suited to situations in which MMS messages are intended for receipt by thousands of such terminals.

FIG. 1 also shows a Gateway GPRS Support Node (GGSN) 17, which acts as a gateway between GPRS data network and the Internet 9: the GGSN 17 maintains location and routing information required to ensure delivery of Internet Protocol (IP) data to the terminals 2, 4. The mobile network 10 can be connected to the Internet 9 via a Wireless Application Protocol (WAP) gateway 15 via the GGSN 17 or other network element or gateway (not shown). When the mobile network 10 is connected to the Internet 9 via a WAP gateway 15, the gateway is configured to provide interworking between terminals 2, 4 and the MMSC 14, as will be described in more detail below.

As stated above, embodiments of the invention are concerned with the delivery of MMS messages to a plurality of recipients. Referring again to FIG. 1, in embodiments of the invention, such delivery is controlled by means of components S1 and DB1, which may be integrated within the MMSC 14 or configured as components separate therefrom. Thus, in a first arrangement, MMS messages originate from a service rather than from a user terminal. These messages may contain information content such as news, weather, entertainment or promotional data, and the mobile network 10 may be configured such that user terminals 2, 4 are required to receive a certain number of such messages in return for subsidized access to network services. Selection of messages may be performed on the basis of individual or group subscription to a particular service, or on the basis of message delivery arrangements between the service provider and operator of the mobile network 10.

The server S1 is arranged to select recipients on the basis of subscriber data held in database 24 and to select message content from the message database DB1; the message content can be populated by a variety of third party content providers (not shown) and scheduled for delivery to recipients as described in, for example, Applicant's international patent application having publication number WO2008/110415. Selection of recipients for the incoming content can be performed by applying a content matching algorithm between the profile of subscribers and attributes of the content; alternatively recipients having specified profile attributes can be actively selected for the content. Recipients selected in these ways are typically referred to as a "target group" for the content and many suitable methods for selecting recipients according to either algorithm are known to those skilled in the art.

Delivery of such messages to the selected recipients proceeds in accordance with the methods described in the Technical Specification (TS) entitled "3rd Generation Partnership Project (3GPP); Technical Specification Group Terminals; Multimedia Messaging Service (MMS); Functional description", and referred to as 3GPP TS 23.140 V6.1.0 (or later versions). In this first embodiment transmission of MMS messages occurs within a given carrier network; accordingly messages are exchanged in accordance with reference point MM1, which is used submit Multimedia Messages from a MMS User Agent running on terminal 2, 4 to MMSC, to let the MMS user agent pull MMS messages from the MMSC, and to exchange notifications and delivery reports between the MMSC and MMS user agents. In one standardised implementation, and indeed as employed in embodiments of the invention, WAP is used as the transfer protocol between the terminals 2, 4 (or rather the user agents running on the terminals). The WAP gateway 15 acts as an interconnection point between the MMSC 14 and the recipient terminal 2, 4, such that data transfer between the WAP gateway 15 and the MMSC 14 occurs via HTTP, while data transfer between the WAP gateway 15 and the user agents running on the terminals 2, 4 occurs via WAP Session Protocol (WSP).

Figure 2:
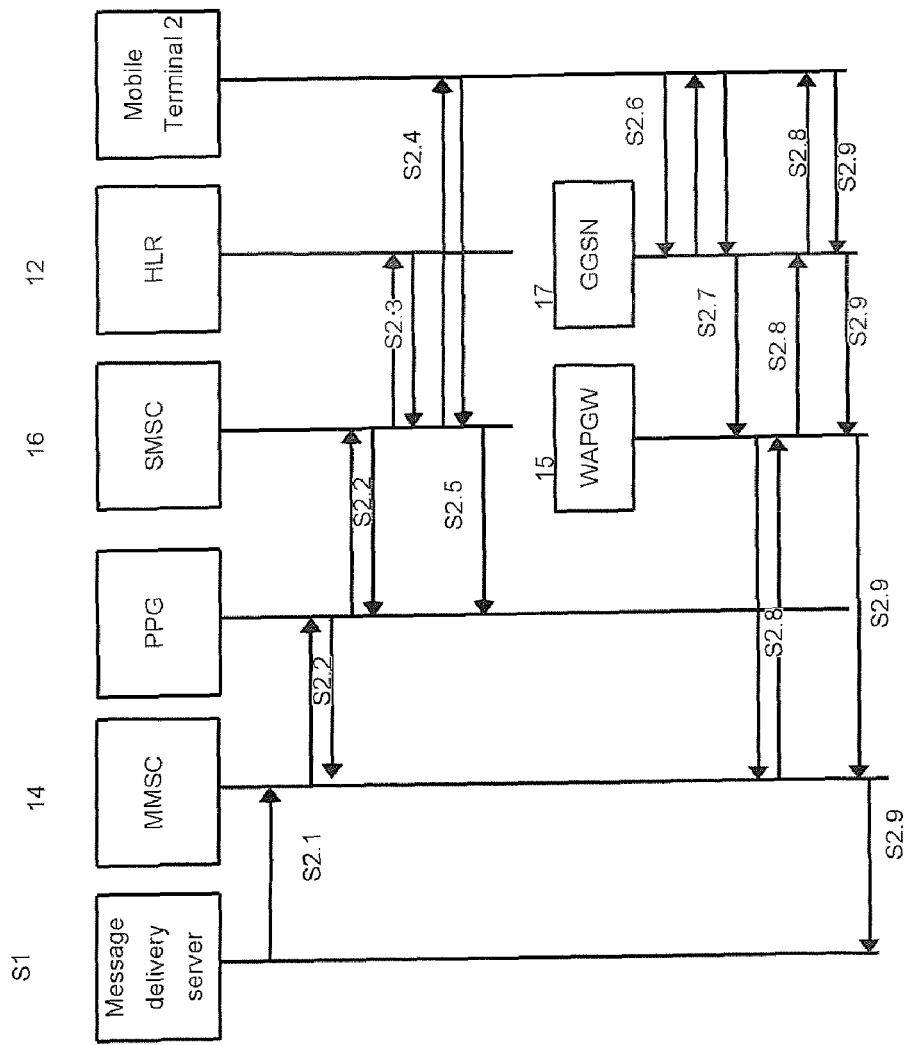
FIG. 2 is a schematic flow diagram showing steps associated with conventional delivery of MMS messages.

A typical, and conventional, data (signal and content) flow is shown in FIG. 2: at step S2.1 an MMS is sent from the Message Delivery Server S1 to the MMSC 14, which sends a push service indicator message to the SMSC 16 via a Push Proxy Gateway (PPG, not shown in FIG. 1). Once received by the SMSC 16, the SMSC 16 sends a routing information query to, and receives the requested routing information from, the HLR 12 (step S2.3). The SMSC 16 then (step S2.4) proceeds to send an SMS message comprising triggering information for triggering the terminal 2 to fetch the MMS message held at the MMSC 14, and concludes its part in the process by sending an acknowledgement to the PPG at step S2.5. The mobile terminal 2 then activates a Packet Data Protocol (PDP) context so as to generate an IP address for the mobile terminal that can be used by the WAP gateway 15 for routing an MMS message to the terminal 2, and sends same to the GGSN 17 (or similar or with a Servicing GPRS Service node (SGSN)) at step S2.6. At step S2.7 the terminal 2 sends a Push confirmation and GET message to the MMSC 14 via the WAP Gateway (WAPGW) 15, and the MMS message is delivered to mobile terminal 2 from the MMSC 14, via the WAP gateway 15 (step S2.8). Finally confirmation of delivery of the message is sent to MMSC 14 and from MMSC to Message Delivery Server S1 (step S2.9).

In the event that a confirmation message is not received at step S2.9, as described in the background section, prior art methods attempt re-transmission of the MMS message: typically the message is reintroduced into the message queue maintained by the MMSC 14 (for any given message pending delivery, the message will sit in the queue between steps S2.1 and S2.8).

Figure 3:
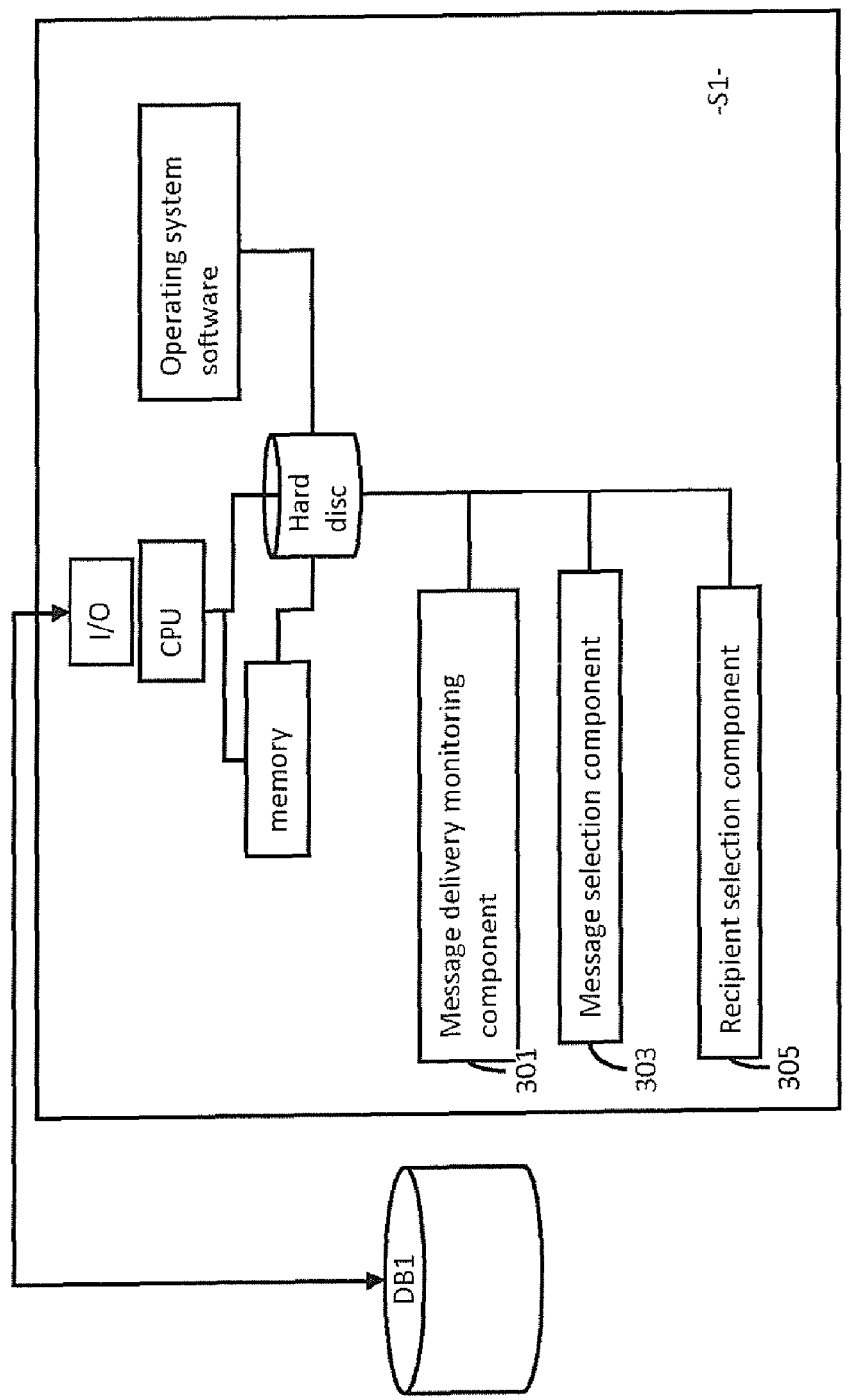
FIG. 3 is a schematic block diagram showing components of a message delivery server according to an embodiment of the invention.
Figure 4:
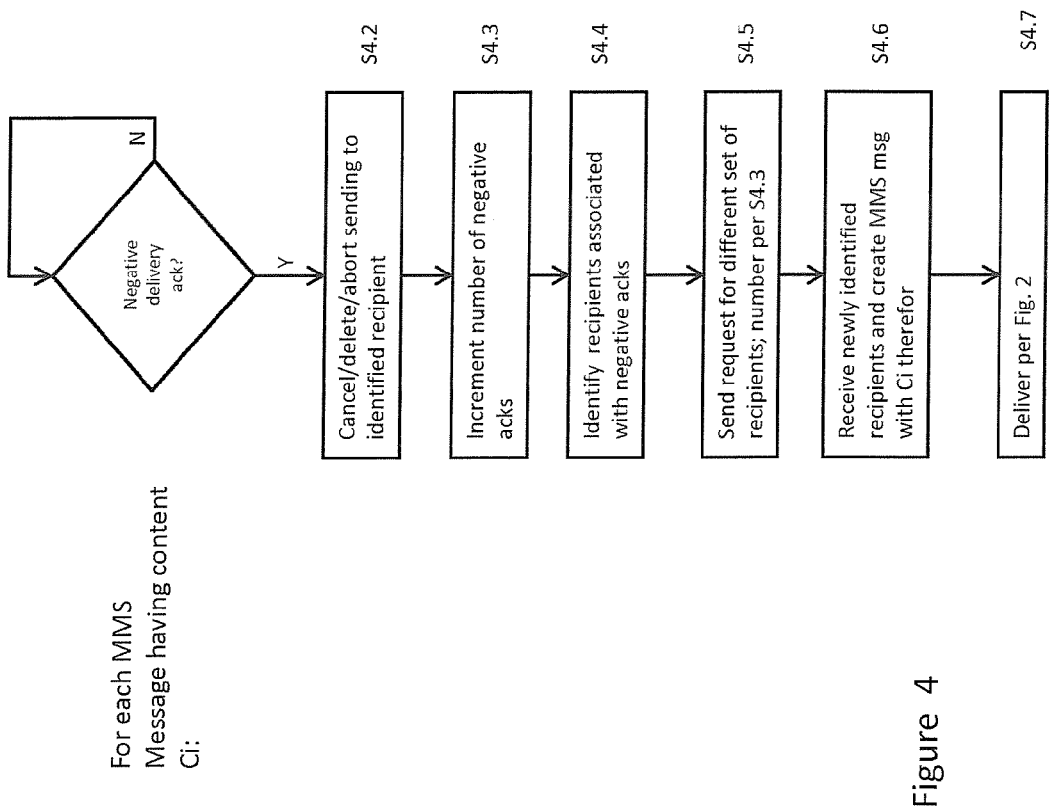
FIG. 4 is a schematic flow diagram showing steps performed by the message delivery server of FIG. 3 according to an embodiment of the invention.

Embodiments of the invention provide improvements to the conventional message handling system and processes described above by way of an extension to the functionality of the message delivery server S1. Referring to FIGS. 3 and 4, it can be seen that in addition to standard operating system, memory, I/O components, in one embodiment the delivery server S1 is configured with a message delivery monitoring component 301 adapted to monitor for receipt of a plurality of negative acknowledgements relating to attempted delivery of MMS messages (step S4.1); responsive to such acknowledgments, and contrary to conventionally embodied delivery servers S1, the monitoring component 301 sends an instruction message to the MMSC 14, or other network elements, comprising instructions to cancel, delete or abort the sending of a message to the recipient in respect of which the negative acknowledgement was received (step S4.2). This effectively frees up the capacity of the MMSC 14, which the delivery server S1 makes use of by selecting different recipients for the aborted message, as will now be explained.

The delivery server S1 additionally includes a message selection component 303, which is arranged to identify, for each set of messages having content C1, the number of negative acknowledgements (step S4.3). This message selection component 303 identifies the previously intended recipients, that is to say recipients that had previously been selected to receive MMS messages having content C1, together with a count of the number of negative acknowledgements received for the content C1, and responsive to a number of negative acknowledgements having been received passing this information to a recipient selection component 305 (step S4.4); as an alternative, step S4.4 could involve evaluating the number of messages that have been transmitted less the number of positive acknowledgements.

In a preferred embodiment the recipient selection component 305 can query the subscriber database 24, in particular the profiles thereof, in order to identify a different set of recipients for the content C1 (Step S4.5). Additionally the recipient selection component 305 preferably includes, as query criteria, a number of recipients as well as characteristics of the content C1 for matching against subscriber profiles, and thereby effectively replaces a first set of recipients having a non-deliverable status with a second set of recipients, whose status may or may not turn out to be deliverable. It will be appreciated that the process (i.e. all steps shown in FIG. 4) is repeated in respect of those recipients of the second set for which a negative delivery acknowledgement has been received so as to select a third set of recipients, and that, in this embodiment, the size of the third set is smaller than that of the second set of recipients. It will further be appreciated that step S4.5 can be performed off-line, e.g. when selecting the initial set of recipients for the messages, candidates for the second and third etc. sets can be selected at the same time; this enables a somewhat immediate generation of a subsequent set of candidate recipients at step S4.5.

For embodiments in which there is a quota of messages that are to be received by a particular group of recipients, the number of recipients selected at step S4.5 can be calculated with an eye on the quota so as to control the number of sets of recipients iteratively selected according to FIG. 4.

For each iteration, the delivery server S1 passes MMS messages suitably configured with transmission data corresponding to the newly identified recipients to the MMSC (step S4.6), which effects the conventional delivery method described above with respect to FIG. 2 (step S4.7).

In the event that potential recipients are pre-profiled by categories and the message content C1 has been classified as one of these categories, retrieval of successive sets of recipients can be conveniently performed by querying a database for recipients having an entry in respect of the category associated with the content C1. Assuming the content to be classified as category A, and that messages having content C1 were originally transmitted to 10000 out of a potential 40000 recipients listed as category A, in the event that the predetermined required number of negative acknowledgements is 5000, and 5000 negative acknowledgments are received, 5000 of the previously unselected (remaining) recipients can be selected. Assuming a 50% success in delivery rate for this next selected set of recipients, 2500 of the 5000 message transmissions should be successful. The total number of delivery attempts is then 10000+5000=15000, with a success rate of ½. This is a significant improvement over the prior art delivery methods, which, as set out in the background section, have an associated message transmission efficiency of 7/25.

The monitoring component 301 can be arranged to receive, or identify, negative delivery acknowledgments in relation to any part of the conventional delivery process exemplified in FIG. 2; for example if the terminal is out of range/switched off, this will be indicated in the request/response interchange with the HLR 12, while if the terminal 2 is unsuccessful in activation of the PDP context, this will be derivable from the message interchange between the terminal and the GGSN 17 or WAP gateway 15. In this latter arrangement, the standard network components do not, of themselves, generate "a negative delivery acknowledgement"; instead, the fact that delivery has been unsuccessful is derivable from the lack of a positive confirmation message as would be expected from the return path between the GGSN 17 and the mobile terminal 2. Confirmation of the delivery of an MMS message can be received by the MMSC 14 via the GGSN 17 and the WAP gateway 15 from the mobile terminal 2. Alternatively, the various network nodes could be configured to monitor for expected responses from the nodes with which they communicate and, in the absence of a suitable response within a specified period of time following the message transmission, the node(s) would be configured to send an error report to the monitoring component 301. One example of such an arrangement is described below in conjunction with FIG. 5.

Other implementations of the MMS delivery process (i.e. non-WAP based) will involve different components, and thus negative acknowledgments will be received from other components of the communications network 10, 9, as will be appreciated by those skilled in the art.

In the foregoing embodiment it is assumed that the number of different recipients is equal to the number of failed transmissions (so if 10000 messages were initially transmitted, and only 5000 were successfully delivered, 5000 different (new) recipients are selected for transmission of the messages). In an alternative embodiment, instead of selecting as many new recipients as there were failed delivery attempts (in the example 5000), a number of recipients greater than the number of failed delivery attempts is selected. For example, in one embodiment 10000 different recipients are selected; assuming the same success rate for message delivery of this second set of 10000 recipients, then the message transmission efficiency will again be ½ (per the first embodiment). Therefore, in this (second) embodiment, the first two sets of message delivery attempts will involve 20000 message transmissions (instead of 15000 message transmissions, as involved in the first two sets of message delivery attempts per the first embodiment). In this regard, it will be appreciated that, in the second embodiment, 20000 message transmissions could be achieved through only two sets of message delivery attempts (10000+10000) (whereas the first embodiment would require 3 sets of message delivery attempts to achieve the same number of message transmissions (10000+5000+5000)).

Further, in a general sense, the selection of the number of recipients can be coupled to the delivery success rate from a previous transmission event. For example, in the first embodiment, the delivery success rate for the delivery of the first set of messages (10000) was 50%, and this was used to select a number of recipients (5000) for the next subsequent transmission event. In the event that the delivery success rate for the initial transmission event had been 7500 (75%), the number of recipients selected for the next transmission event that would result in all 10000 messages being successfully delivered after the second delivery event would be 2500/0.75=3333.33 recipients.

Figure 5:
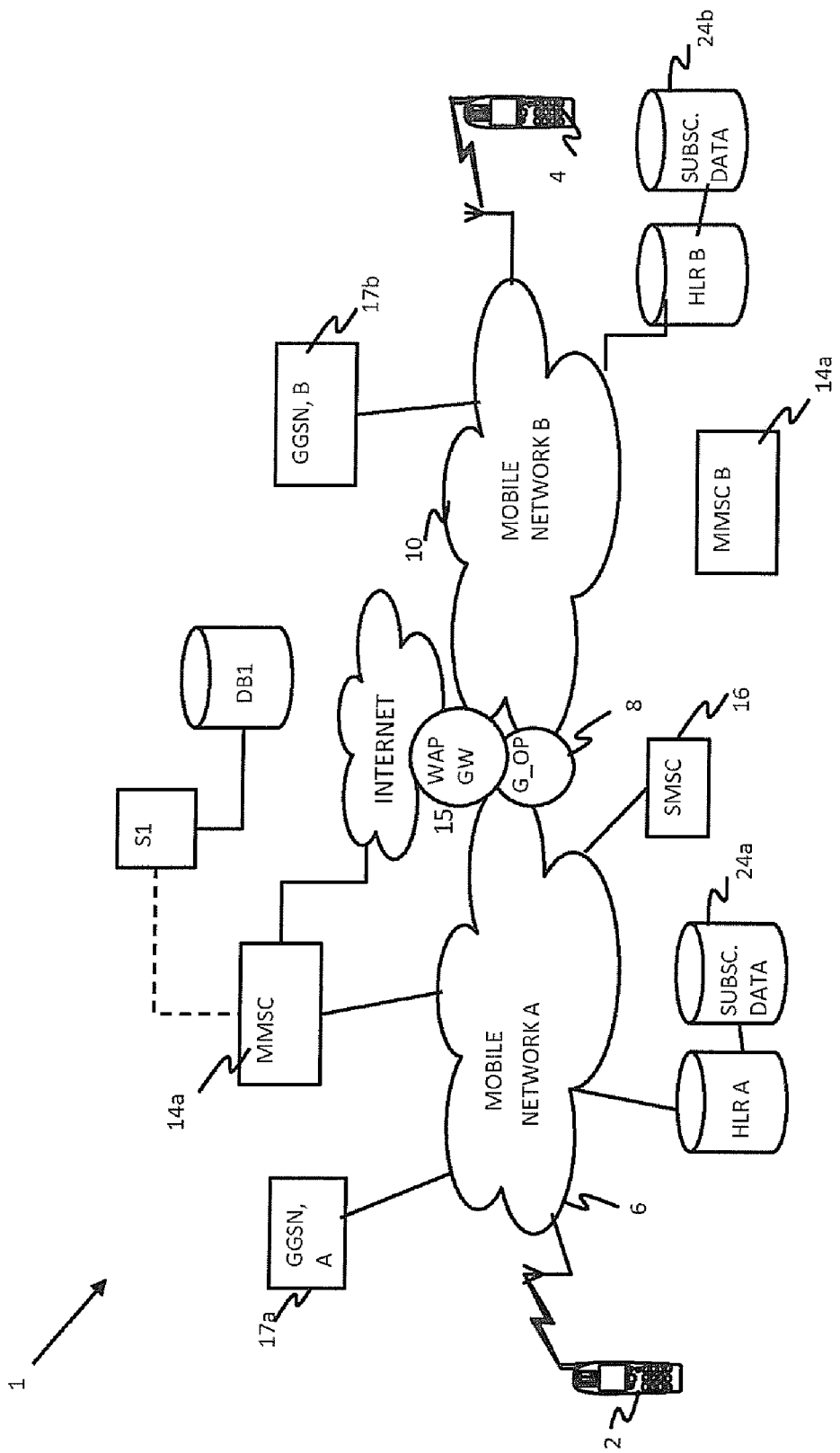
FIG. 5 is a schematic diagram showing an environment in which a second embodiment of the invention can operate.

FIG. 5 shows a further embodiment, which differs from the foregoing in that MMS messages are delivered to recipients of mobile networks associated with different carriers. This alternative embodiment is particularly applicable in cases in which the message delivery server S1 is operated by a third party information provider that is quite distinct from the carrier associated with either communications network A, B. In this arrangement MMS messages are transmitted between carriers, and this involves use of the MM4 interface: as described in the above-referenced 3GPP TS, the MM4 interface supports the sending of messages between an MMSC, A in a first mobile service environment (i.e. network) and an MMSC, B in a second mobile service environment. The information provider is likely to be associated with (i.e. have a subscription with) one particular carrier, yet will be subscribed to by recipients of the same and different carriers. As a result MMS message from the service's carrier network and to other carriers proceeds according to the protocol set associated with the MM4 interface.

One particular method for monitoring for negative delivery acknowledgements is described in international patent application having publication number WO2005/076572, and involves sending a MM4 forward. REQ pdu request that explicitly request a delivery acknowledgment. The request message is received by MMSC, B in mobile network B, and MMSC, B has responsibility for deriving delivery status of each intended recipient in mobile network B. Acknowledgements are sent back to MMSC, A in mobile network A, and thence to the delivery server S1, which implements the method described above with reference to FIG. 4 so as to select alternative recipients for the content C1. It will be appreciated that because, in this embodiment, the delivery server S1 is associated with a third party rather than with any one carrier network, the repository holding data corresponding to potential recipients is maintained by the third party. Suitable recipient data (including profile information) can be stored in DB1 or an equivalent distributed storage system accessible to the delivery server S1.

The above embodiments are to be understood as illustrative examples of the invention. Further embodiments of the invention are envisaged. For example, whilst MMS messages are described as emanating from a service server S1, embodiments of the invention could alternatively be used to control the distribution of messages from a user terminal to a preferred and configurable list of recipients maintained locally on the user terminal.

In the above embodiments the server S1 is configured to record the delivery success, or otherwise, of previously transmitted MMS messages, and to select further recipients in the event that a predetermined plurality of the previously transmitted MMS messages are determined not to have been delivered to the initially selected recipients. In addition the server S1 is described as being responsible for transmitting MMS messages, via the MMSC 14 and other components, to both the initially selected and newly selected (i.e. further) recipients. However, it is to be understood that the functionality required to transmit the messages could instead be provided by a separate network component (not shown), so that the server S1 passes instructions for message delivery to this separate component, which then takes responsibility for sending out the messages, receiving delivery report information and passing same back to the server S1.

Whilst the above embodiments relate to controlling the delivery of MMS messages, embodiments could also be applied in respect of the delivery of Short Message Service (SMS) messages; for these types of messages, failed delivery of messages can be derived from signalling messages received from the HLR or the SMSC involved in message delivery.

It will be appreciated that the number of further recipients which are selected is preferably dependent on the number of MMS messages identified as having failed to be delivered. For example, the number of failed delivery attempts could set a minimum threshold for a number of recipients subsequently selected to receive messages. Alternatively the number of failed delivery attempts could set a maximum threshold for a number of recipients subsequently selected to receive messages, with the actual number being a factor, (less than one) ie: a multiple of the number of failed delivery attempts.

Further, whilst in the above-embodiments further recipients are selected from the pool of potential recipients having a profile that matches the content C1 within the MMS messages, it will be appreciated that this presupposes there is a greater number of recipients having a profile matching content C1 than there is failed delivery attempts. In the event that the pool of potential recipients comprises fewer recipients than the number of failed delivery attempts from a previous delivery iteration, the delivery server S1 could either select different content C2 (and thus a different potential recipient base), or could perform profile matching upon subscribers so as to identify potential recipients having a profile similar to that matching content C1 and thereby increase the recipient base. As a further alternative, subscribers could be selected at random rather than on the basis of any kind of profile matching.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
monitoring delivery status information associated with a first advertising campaign transmission comprising a plurality of messages to determine whether each message was delivered successfully, wherein each of the plurality of messages transmitted in the first advertising campaign transmission contains at least the same advertising content and is transmitted to a different recipient; and
upon a predetermined plurality of the messages being identified to have not been delivered successfully, triggering selection of further recipients to receive a second advertising campaign transmission, the number of further recipients selected being dependent on the number of messages identified as having not been delivered successfully, wherein the further recipients are different than the recipients of the first advertising campaign transmission.

2. A method according to claim 1, further comprising cancelling further delivery attempts in respect of messages identified to have not been delivered successfully.

3. A method according to claim 1, wherein the content has one or more characteristics and triggering selection of further recipient further comprises:
accessing a storage system arranged to hold data indicative of profile information associated with the further recipients; and
identifying the further recipients on the basis of the characteristics of the content and the profile information.

4. A method according to claim 1, wherein triggering selection of further recipients further comprises selecting a number of the further recipients equal to the predetermined number of messages identified as having not been delivered successfully.

5. A method according to claim 1, wherein triggering selection of further recipients further comprises selecting a number of the further recipients greater than the predetermined number of messages identified as having not been delivered successfully.

6. A method according to claim 4, further comprising transmitting messages comprising the content to the selected further recipients.

7. A method according to claim 6, wherein at least some of the messages transmitted to the selected further recipients are newly created messages, each having transmission information identifying a terminal associated with a selected further recipient.

8. A method according to claim 6, further comprising modifying the transmission information of at least some of the identified messages so as to specify a destination address corresponding to a terminal associated with a selected further recipient.

9. A method according to claim 1, further comprising logging signaling data indicative of the state of recipient terminals so as to identify transmitted messages identified as having not been delivered successfully.

10. A method according to claim 9, wherein not having been delivered successfully indicates one of an invalid recipient address; an incomplete transmission; content of the message not accepted; recipient terminal not available.

11. A method according to claim 9, wherein the signaling information is received from one or more core network components including Home Location Register, Wireless Application Protocol (WAP) Gateway, GPRS Support Node (GGSN).

12. A method according to claim 11, wherein at least some of the network components are associated with a mobile network carrier different to that from which the messages originate.

13. A method according to claim 1, wherein a previously transmitted message is identified as having not been delivered successfully in the absence of signaling information indicating successful delivery of the previously transmitted message.

14. A method according to claim 13, wherein the previously transmitted message is identified as having not been delivered successfully in the event that the signaling information is not received within a predetermined period of time having passed since transmission of the previously transmitted message.

15. A method according to claim 1, wherein the method is repeated for successively smaller values of the predetermined number of messages forming the basis of the selection of the further recipients.

16. A method according to claim 1, further comprising receiving the content from a selected one of a plurality of content providers and creating the plurality of messages for delivery to initial recipients, the initial recipients being determined to have profiles matching the received content.

17. A system comprising:
monitoring means configured to monitor delivery status information associated with a first advertising campaign transmission comprising a plurality of messages to determine whether each message was delivered successfully, wherein each of the plurality of messages transmitted in the first advertising campaign transmission contains at least the same advertising content and is transmitted to a different recipient,
the monitoring means further configured to, upon a predetermined number of the messages being identified to have not been delivered successfully, trigger selection of further recipients to receive a second advertising campaign transmission, the number of further recipients selected being dependent on the number of messages identified as having not been delivered successfully, wherein the further recipients are different than the recipients of the first advertising campaign transmission.

18. A system according to claim 17, wherein the system is further arranged to cancel further delivery attempts in respect of messages identified to have not been delivered successfully.

19. A system according to claim 17, wherein the content has one or more characteristics, and, upon triggering selection of further recipients, the system is arranged to:
access a storage system arranged to hold data indicative of profile information associated with potential said further recipients; and
identify said further recipients on the basis of the characteristics of the content and the profile information.

20. A system according to claim 17, wherein, upon triggering selection of further recipients, the system is arranged to select a number of further recipients equal to the predetermined number of messages identified as having not been delivered successfully.

21. A system according to claim 17, wherein, upon triggering selection of further recipients, the system is arranged to select a number of further recipients greater than the predetermined number of messages identified as having not been delivered successfully.

22. A system according to claim 20, the system further comprising an interface arranged to transmit messages comprising the content to the selected further recipients.

23. A system according to claim 17, wherein the system is arranged to log signaling data indicative of the state of recipient terminals so as to identify transmitted messages having not been delivered successfully.

24. A system according to claim 23, wherein having not been delivered successfully indicates one of an invalid recipient address; an incomplete transmission; content of the message not accepted; recipient terminal not available.

25. A system according to claim 23, wherein the system is arranged to receive signaling information from one or more core network components including Home Location Register, Wireless Application Protocol (WAP) Gateway, GPRS Support Node (GGSN).

26. A system according to claim 25, wherein at least some of the network components are associated with a mobile network carrier different to that from which the messages originate.

27. A computer program, or a suite of computer programs, embodied in a non-transitory computer readable storage media and, comprising a set of executable program instructions resident on the non-transitory computer readable storage media, wherein execution of said program instructions, causes a computer, or a suite of computers, to:
monitor delivery status information associated with a first advertising campaign transmission comprising a plurality of messages to determine whether each message was delivered successfully, wherein each of the plurality of messages transmitted in the first advertising campaign transmission contains at least the same advertising content and is transmitted to a different recipient; and
upon a predetermined plurality of the messages being identified to have not been delivered successfully, trigger selection of further recipients to receive a second advertising campaign transmission, the number of further recipients selected being dependent on the number of messages identified as having not been delivered successfully, wherein the further recipients are different than the recipients of the first advertising campaign transmission.

28. A non-transitory computer-readable medium having stored thereon computer executable instructions which when executed by a computer:
monitors delivery status information associated with a first advertising campaign transmission comprising a plurality of messages to determine whether each message was delivered successfully, wherein each of the plurality of messages transmitted in the first advertising campaign transmission contains at least the same advertising content and is transmitted to a different recipient; and
upon a predetermined plurality of the messages being identified to have not been delivered successfully, triggers selection of further recipients to receive a second advertising campaign transmission, the number of further recipients selected being dependent on the number of messages identified as having not been delivered successfully, wherein the further recipients are different than the recipients of the first advertising campaign transmission.

* * * * *